(12) United States Patent
Tao et al.

(10) Patent No.: US 12,523,714 B2
(45) Date of Patent: Jan. 13, 2026

(54) CABLE INSPECTION APPARATUS

(71) Applicants: Tyco Electronics (Shanghai) Co. Ltd., Shanghai (CN); TE Connectivity Services GmbH, Schaffhausen (CH)

(72) Inventors: Zongjie Tao, Shanghai (CN); Dandan Zhang, Shanghai (CN); Roberto Francisco-Yi Lu, Bellevue, WA (US); Lvhai Hu, Shanghai (CN); Yuhang Shang, Shanghai (CN); Hongze Li, Shanghai (CN)

(73) Assignees: TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 285 days.

(21) Appl. No.: 16/952,658

(22) Filed: Nov. 19, 2020

(65) Prior Publication Data

US 2021/0148997 A1    May 20, 2021

(30) Foreign Application Priority Data

Nov. 20, 2019    (CN) .......................... 201911139329.5

(51) Int. Cl.
*G01R 31/59*   (2020.01)
*G01N 21/88*   (2006.01)
*H02G 15/28*   (2006.01)
*H04N 23/51*   (2023.01)

(52) U.S. Cl.
CPC ......... *G01R 31/59* (2020.01); *G01N 21/8803* (2013.01); *H02G 15/28* (2013.01); *H04N 23/51* (2023.01)

(58) Field of Classification Search
CPC .............................. G01R 31/59; G01N 21/952
See application file for complete search history.

(56) References Cited

U.S. PATENT DOCUMENTS

| | | | |
|---|---|---|---|
| 6,597,455 B1 * | 7/2003 | Wlodarski | G01N 21/952 356/237.1 |
| 7,006,211 B1 * | 2/2006 | Belew | G01N 21/952 250/234 |
| 9,247,213 B2 * | 1/2016 | Aono | G01N 21/9515 |
| 2014/0331901 A1 * | 11/2014 | Seefeldt | A47B 21/06 108/50.02 |
| 2018/0105393 A1 * | 4/2018 | Miyajima | B66B 7/1215 |

* cited by examiner

*Primary Examiner* — Noam Reisner
(74) *Attorney, Agent, or Firm* — Barley Snyder

(57) ABSTRACT

A cable inspection apparatus includes an image capturing device and a determination device. The image capturing device includes a ring camera frame and a plurality of cameras mounted on the ring camera frame and distributed at intervals on a circumference of the ring camera frame. The cameras simultaneously capture images of a cable to be inspected extending through the ring camera frame from a plurality of different angles. The determination device determines whether or not a portion of the cable is qualified according to the images.

21 Claims, 3 Drawing Sheets

CABLE INSPECTION APPARATUS

CROSS-REFERENCE TO RELATED APPLICATION

This application claims the benefit of the filing date under 35 U.S.C. § 119(a)-(d) of Chinese Patent Application No. 201911139329.5, filed on Nov. 20, 2019.

FIELD OF THE INVENTION

The present disclosure relates to a cable inspection apparatus and, more particularly, to a cable inspection apparatus adapted to inspect whether or not each portion of a cable in a length direction is qualified.

BACKGROUND

A cable inspection apparatus usually comprises a camera for capturing an image of a cable and a determination device (for example, a computer operating thereon an image analysis and processing software) for determining whether the cable is qualified according to the captured image. However, the existing cable inspection apparatus is generally only suitable for the inspection of the cable of one shape, and cannot be used for the inspection of cables of different shapes.

SUMMARY

A cable inspection apparatus includes an image capturing device and a determination device. The image capturing device includes a ring camera frame and a plurality of cameras mounted on the ring camera frame and distributed at intervals on a circumference of the ring camera frame. The cameras simultaneously capture images of a cable to be inspected extending through the ring camera frame from a plurality of different angles. The determination device determines whether or not a portion of the cable is qualified according to the images.

BRIEF DESCRIPTION OF THE DRAWINGS

The invention will now be described by way of example with reference to the accompanying Figures, of which.

DETAILED DESCRIPTION OF THE EMBODIMENTS

Figure 1:
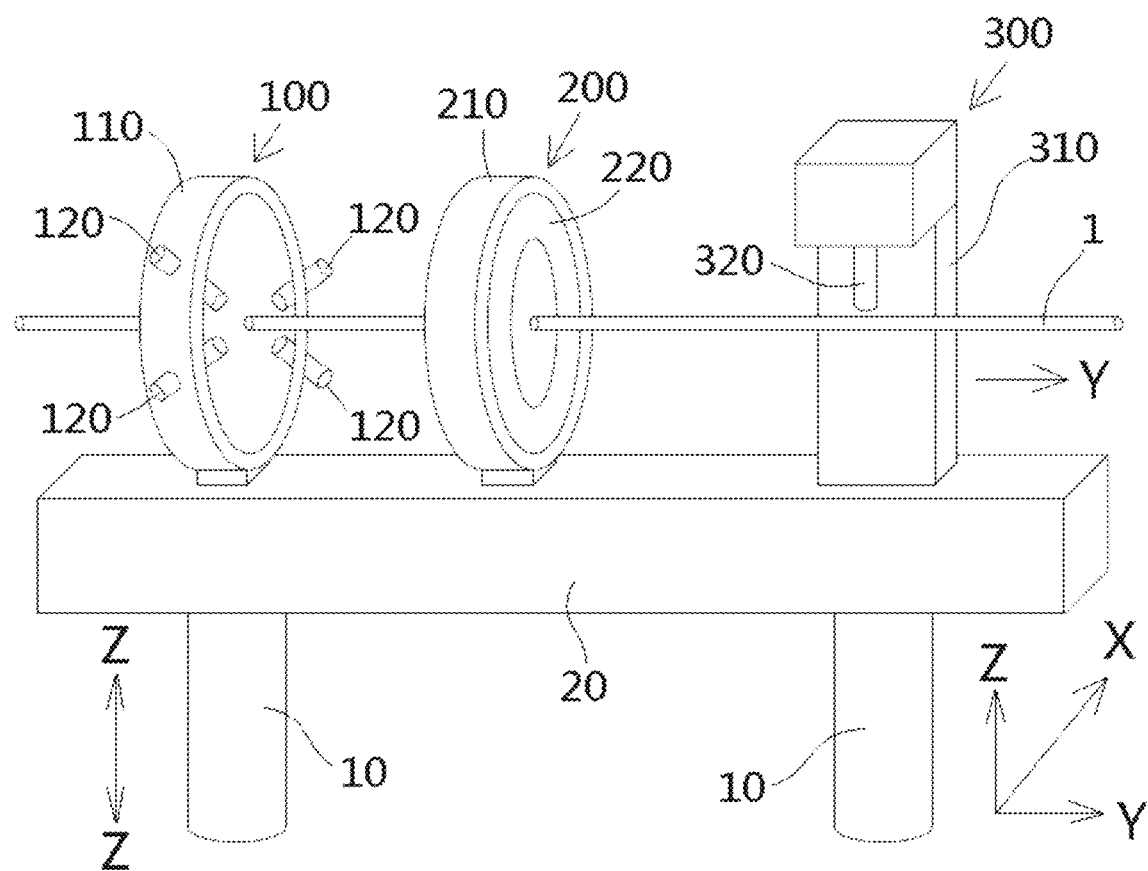
FIG. 1 is a schematic perspective view of a cable inspection apparatus according to an embodiment.

Technical solutions of the present disclosure will be described hereinafter in further detail with reference to the following embodiments, taken in conjunction with the accompanying drawings. In the description, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

A cable inspection apparatus according to an embodiment, as shown in FIG. 1, comprises an image capturing device 100 adapted to capture an image of a cable 1 to be inspected and a determination device adapted to determine whether or not a portion, which is currently captured, of the cable 1 is qualified according to the currently captured image. The determination device may be a computer on which an image analysis and processing software is executable or operable.

Figure 2:
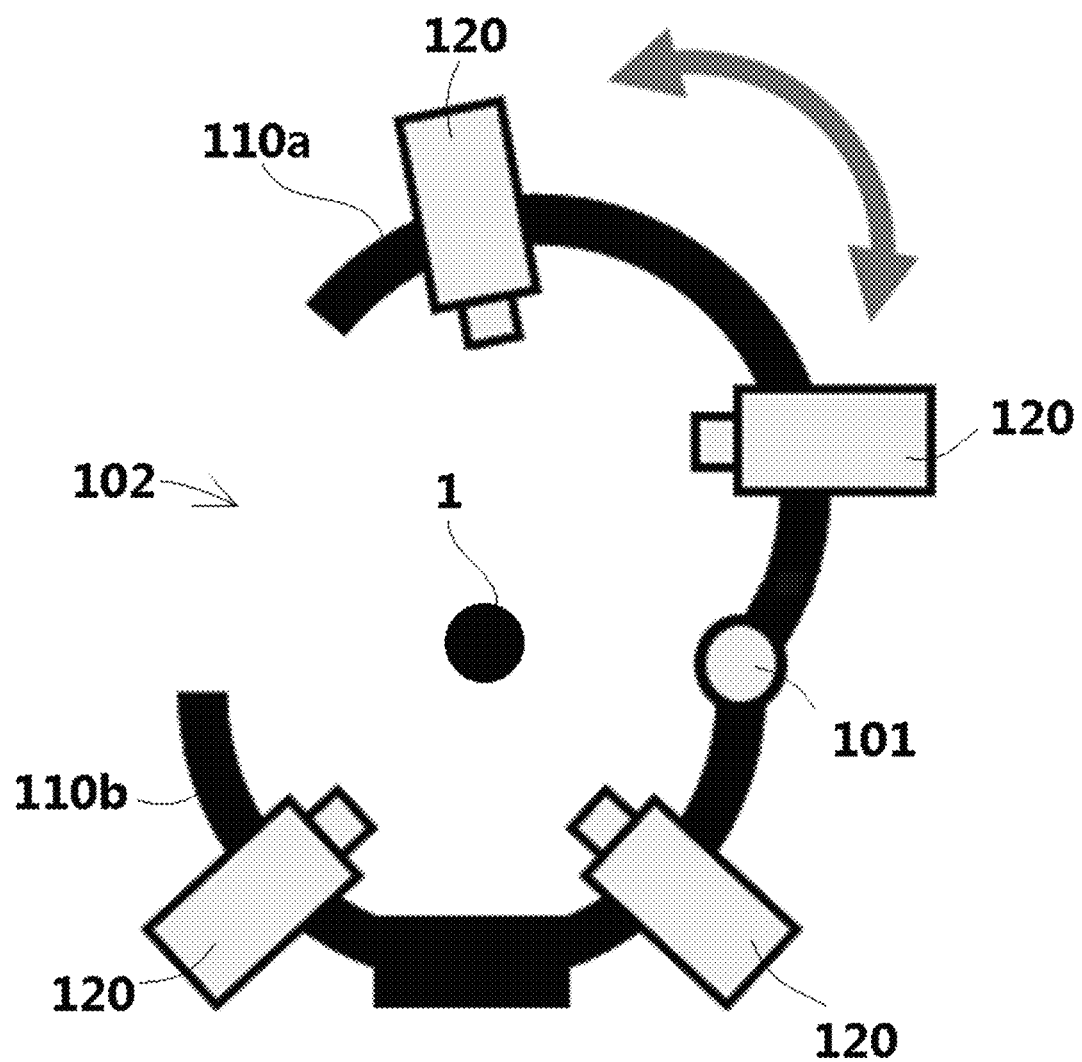
FIG. 2 is a schematic end view of an image capturing device of the cable inspection apparatus.

The image capturing device 100, as shown in FIGS. 1 and 2, includes a ring camera frame 110 and a plurality of cameras 120 mounted on the ring camera frame 110 and distributed at intervals on a circumference of the ring camera frame 110. The plurality of cameras 120 surround the cable 1 passing through the ring camera frame 110 so as to simultaneously capture images of the cable 1 from multiple different angles. The cable inspection apparatus is therefore adapted to inspect cables 1 of various shapes. In the embodiment shown in FIG. 1, four cameras 120 are installed on the ring camera frame 110. The present disclosure, however, is not limited thereto, and two, three, five or more cameras 120 may be installed on the ring camera frame 110 as well.

As shown in FIG. 1, in the illustrated embodiment, the cable 1 passes through the ring camera frame 110 along a central axis of the ring camera frame 110, and optical axes of the plurality of cameras 120 intersect with the center axis of the ring camera frame 110 at one point. In the shown embodiment, the plurality of cameras 120 are evenly distributed at an interval on the circumference of the ring camera frame 110. For example, when four cameras 120 are installed on the ring camera frame 110, an interval angle of the two adjacent cameras 120 in a circumferential direction of the ring camera frame 110 is 90 degrees.

Figure 3:
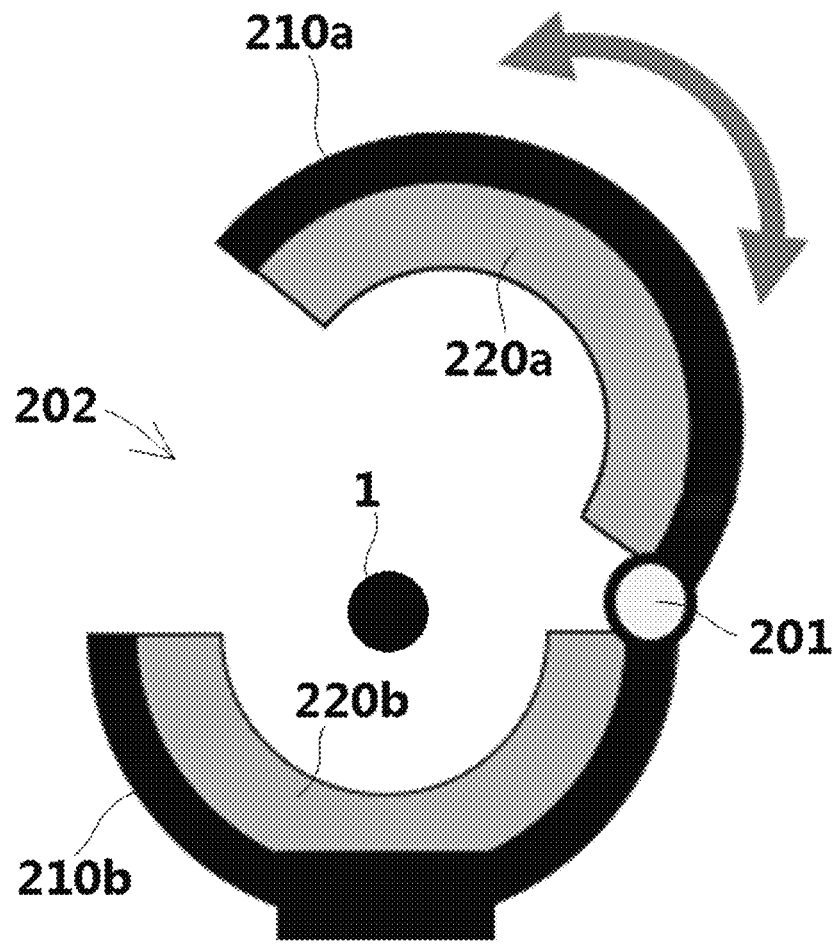
FIG. 3 is a schematic end view of an illumination device according to an embodiment.

As shown in FIGS. 1 and 3, in the illustrated embodiment, the cable inspection apparatus further comprises an illumination device 200 provided at one side of the image capturing device 100 in an axial direction thereof and configured to provide illumination for the image capturing device 100. The illumination device 200 includes a ring lamp holder 210 and a ring lamp 220 installed on an inner side wall of the ring lamp holder 210. The cable 1 can pass through the ring lamp holder 210 along a central axis of the ring lamp holder 210.

As shown in FIG. 1, in the illustrated embodiment, the cable inspection apparatus further comprises a marking device 300 adapted to mark an unqualified mark on a portion, which is determined to be unqualified, of the cable 1. The marking device 300 includes a mounting frame 310 and a printing device 320 mounted on the mounting frame 310. The printing device 320 is adapted to print out the unqualified mark onto the cable 1. The printing device 320 may be an inkjet printer.

The cable inspection apparatus is adapted to inspect the quality of the cable 1 online. That is, the quality of the cable 1 can be inspected online in real time on a production line of the cable 1. In the embodiment shown in FIG. 1, the image capturing device 100, the illumination device 200 and the marking device 300 are arranged sequentially along a conveying direction of the cable 1.

As shown in FIG. 2, in the illustrated embodiment, the ring camera frame 110 of the image capturing device 100 comprises a semi-ring upper camera frame 110a and a semi-ring lower camera frame 110b rotatably connected together at the ends thereof so that the upper camera frame 110a is rotatably openable relative to the lower camera frame 110b. In this way, the cable 1 may enter or exit the ring camera frame 110 through an opening 102 of the opened ring camera frame 110. In the embodiment shown in FIG. 2, an end of the upper camera frame 110a may be hinged with an end of the lower camera frame 110b by a hinge 101.

As shown in FIG. 3, in the illustrated embodiment, the ring lamp holder 210 includes a semi-ring upper lamp holder 210a and a semi-ring lower lamp holder 210b. The ring lamp 220 includes a semi-ring upper lamp 220a installed on the upper lamp holder 210a and a semi-ring lower lamp 220b installed on the lower lamp holder 210b. An end of the upper lamp holder 210a is rotatably connected with an end of the lower lamp holder 210b so that the upper lamp holder 210a is rotatably openable relative to the lower lamp holder 210b. In this way, the cable 1 may enter or exit the ring light holder 210 through an opening 202 of the opened ring light holder 210. In the illustrated embodiment, the end of the upper lamp holder 210a may be hinged with the end of the lower lamp holder 210b by a hinge 201.

As shown in FIG. 1, in the illustrated embodiment, the cable inspection apparatus further comprises a support device 10, 20. The image capturing device 100, the illumination device 200 and the marking device 300 are supported on the support device 10, 20. The support device 10, 20 includes a support platform 20 and a support leg 10 supported on a bottom portion of the support platform 20. The image capturing device 100, the illumination device 200 and the marking device 300 are supported on the support platform 20. In the illustrated embodiment, the support leg 10 has a length adjustable in a height direction Z so as to adjust a height of the support device 10, 20 so that the cable inspection apparatus is suitable for cables 1 of different heights or lengths.

As shown in FIG. 1, in the illustrated embodiment, the image capturing device 100, the illumination device 200 and the marking device 300 are movably installed on the support platform 20, so that the image capturing device 100, the illumination device 200 and the marking device 300 are adjustable in position in a horizontal direction. The image capturing device 100, the illumination device 200 and the marking device 300 are movable in a first horizontal direction Y parallel to the cable 1 and a second horizontal direction X perpendicular to the cable 1. In an embodiment of the disclosure, a translation mechanism is installed on the support platform 20. The image capturing device 100, the illumination device 200 and the marking device 300 are mounted on the translation mechanism. In this way, the image capturing device 100, the illumination device 200, and the marking device 300 may be moved in the first horizontal direction Y and the second horizontal direction X by the translation mechanism.

It should be appreciated by those skilled in this art that the above embodiments are intended to be illustrative, and many modifications may be made to the above embodiments by those skilled in this art. Further, various structures described in various embodiments may be freely combined with each other without conflicting in configuration or principle.

Although the disclosure has been described hereinbefore in detail with reference to the attached drawings, it should be appreciated that the disclosed embodiments in the attached drawings are intended to illustrate the embodiments of the disclosure by way of example, and should not be construed as limitation to the disclosure.

Although a few embodiments of the general inventive concept of the disclosure have been shown and described, it would be appreciated by those skilled in the art that changes or modification may be made to these embodiments without departing from the principles and spirit of the general inventive concept, the scope of which is defined in claims and their equivalents.

What is claimed is:

1. A cable inspection apparatus, comprising:
    an image capturing device having a first stand, the first stand includes a first ring camera frame and a plurality of cameras mounted on and positioned through the ring camera frame and distributed at intervals on a circumference of the ring camera frame, the cameras simultaneously capture images of a cable to be inspected extending through the ring camera frame from a plurality of different angles;
    an illumination device having a second stand, a gap is positioned between the first stand of the image capturing device and the second stand of the illumination device, the illumination device providing an illumination through a ring lamp to the cable the ring lamp extending continuously along an inner side wall of a ring lamp holder, the illumination device providing light absorption to an open side of the ring camera frame; and
    a marking device having a separate mounting frame, a gap is positioned between the mounting frame of the marking device and the second stand of the illumination device; and
    a determination device adapted to determine whether or not a portion of the cable is qualified according to the images.

2. The cable inspection apparatus of claim 1, wherein the cable extends through the ring camera frame along a central axis of the ring camera frame, an optical axis of each of the plurality of cameras intersects with the center axis of the ring camera frame at a same point.

3. The cable inspection apparatus of claim 2, further comprising the illumination device provided at the side of the image capturing device in an axial direction of the image capturing device.

4. The cable inspection apparatus of claim 3, wherein the illumination device includes the ring lamp holder through which the cable passes along a separate central axis of the ring lamp holder distinct from the central axis of the ring camera frame.

5. The cable inspection apparatus of claim 4, wherein the ring lamp holder includes a semi-ring upper lamp holder and a semi-ring lower lamp holder.

6. The cable inspection apparatus of claim 5, wherein the ring lamp includes a semi-ring upper lamp installed on the semi-ring upper lamp holder and a semi-ring lower lamp installed on the semi-ring lower lamp holder.

7. The cable inspection apparatus of claim 6, wherein the semi-ring upper lamp holder and the semi-ring lower lamp holder are rotatably connected, the semi-ring upper lamp holder is rotatably openable relative to the semi-ring lower lamp holder.

8. The cable inspection apparatus of claim 7, wherein an end of the semi-ring upper lamp holder is connected with the semi-ring lower lamp holder by a hinge.

9. The cable inspection apparatus of claim 1, wherein the cameras are evenly distributed at an interval on the circumference of the ring camera frame.

10. The cable inspection apparatus of claim 1, wherein the marking device is adapted to mark an unqualified mark on a portion of the cable determined to be unqualified through an image analysis.

11. The cable inspection apparatus of claim 10, wherein the marking device includes a printing device mounted on the mounting frame and adapted to print out the unqualified mark onto the cable.

12. The cable inspection apparatus of claim 10, further comprising a support device on which the image capturing device, the illumination device, and the marking device are supported.

13. The cable inspection apparatus of claim 12, wherein the support device includes a support platform on which the image capturing device, the illumination device, and the marking device are supported and a support leg supported on a bottom portion of the support platform.

14. The cable inspection apparatus of claim 13, wherein the support leg has a length adjustable in a height direction to adjust a height of the support device, the cable inspection apparatus is usable with cables of different lengths.

15. The cable inspection apparatus of claim 14, wherein the image capturing device, the illumination device, and the marking device are movably installed on the support platform and are adjustable in position in a horizontal direction.

16. The cable inspection apparatus of claim 15, wherein the image capturing device, the illumination device, and the marking device are movable in a first horizontal direction parallel to the cable and a second horizontal direction perpendicular to the cable.

17. The cable inspection apparatus of claim 10, wherein the image capturing device, the illumination device, and the marking device are arranged sequentially in a direction of conveying the cable.

18. The cable inspection apparatus of claim 1, wherein the ring camera frame includes a semi-ring upper camera frame and a semi-ring lower camera frame rotatably connected to the semi-ring upper camera frame, the semi-ring upper camera frame is rotatably openable relative to the semi-ring lower camera frame, the semi-ring upper camera frame and the semi-ring lower camera frame include an equal amount of cameras.

19. The cable inspection apparatus of claim 18, wherein an end of the semi-ring upper camera frame is connected with an end of the semi-ring lower camera frame by a hinge.

20. The cable inspection apparatus of claim 1, wherein the cable inspection apparatus inspects a quality of the cable in real time on a production line of the cable.

21. The cable inspection apparatus of claim 1, wherein the illumination device is externally housed and spatially separated away from a housing of the image capturing device.

\* \* \* \* \*